Jan. 31, 1928. 1,657,795
P. GUERIN
MOTION PICTURE CAMERA
Filed Dec. 5, 1925 2 Sheets-Sheet 2
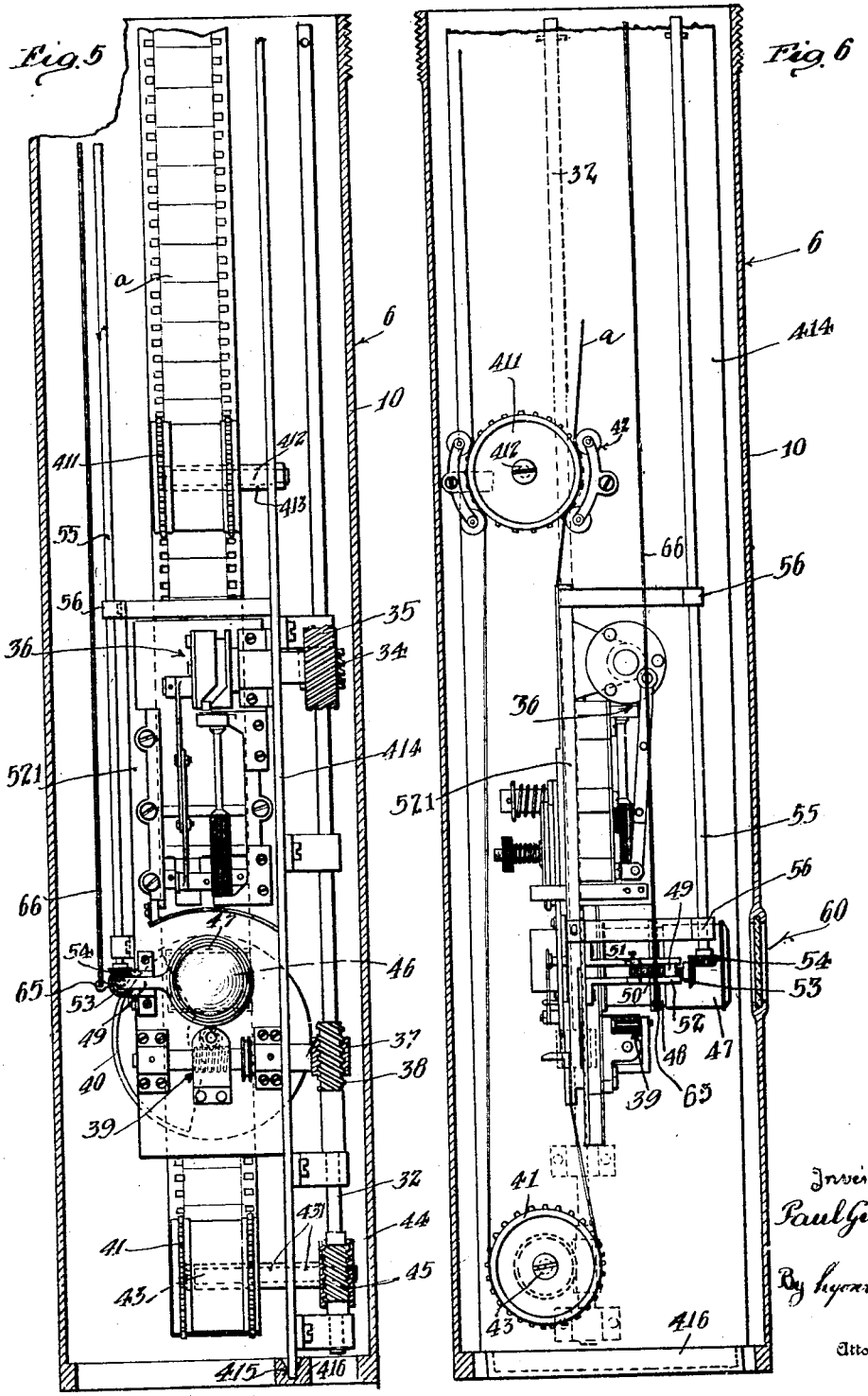
Inventor
Paul Guerin Patented Jan. 31, 1928.

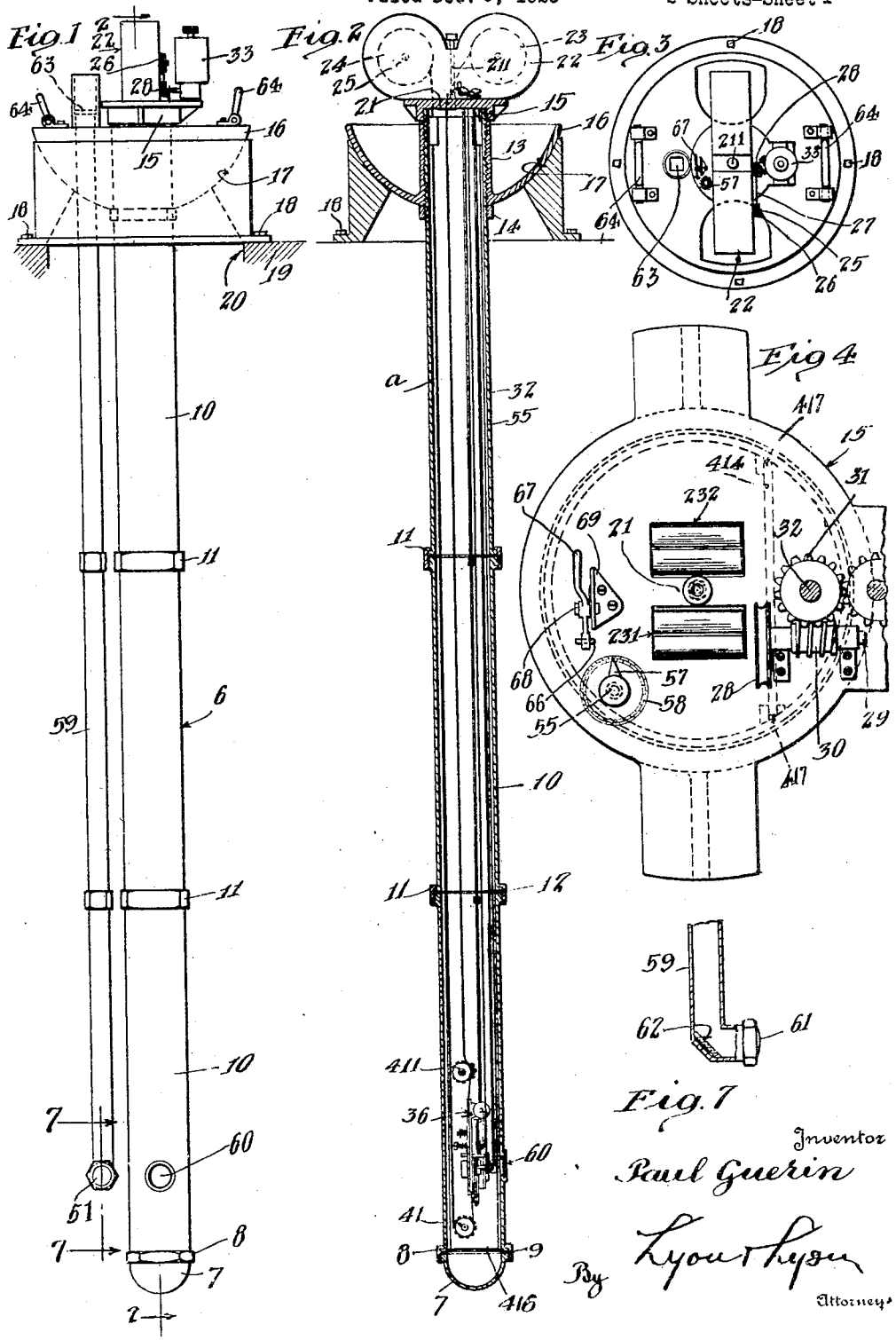

1,657,795

UNITED STATES PATENT OFFICE.

PAUL GUERIN, OF LOS ANGELES, CALIFORNIA, ASSIGNOR TO MACK SENNETT, INC., OF LOS ANGELES, CALIFORNIA, A CORPORATION OF CALIFORNIA.

MOTION-PICTURE CAMERA.

Application filed December 5, 1925. Serial No. 73,375.

This invention relates to motion picture cameras and, especially, to that type suitable for taking a scene that is located at right angles to the axis of the camera lens. The construction is such as to make it possible to position a portion of the film beneath the surface of a body of water so that marine scenes can be taken without excessive absorption of the light radiation.

An object of the invention is to make it possible to operate a camera inboard in a boat or other structure so as to expose a portion of the film in an outboard position, thus making it possible to make exposures from an aeroplane or boat of scenes lying outside of the same with as good results as when the scenes are directly in front of the camera.

Another object is to provide in the camera a barrel through which the film passes and which can be tilted at various angles relative to its support so as to facilitate the photographing of scenes lying in different directions and accomplish the photographing without the necessity of making relatively long exposures.

Other objects of the invention will appear hereinafter.

The accompanying drawings illustrate the invention:

Fig. 1 is a side elevation of a motion picture camera constructed in accordance with the provisions of this invention.

Fig. 2 is a view of the camera partly in longitudinal midsection on the line indicated by 2—2, Fig. 1.

Fig. 3 is a plan view of Fig. 1.

Fig. 4 is an enlarged fragmental plan view showing a portion of the film actuating mechanism.

Fig. 5 is an enlarged view of the lower portion of Fig. 2 the view corresponding to the view of the same parts in Fig. 2, the barrel being in vertical midsection.

Fig. 6 is a side elevation of Fig. 5, the barrel being in vertical midsection.

Figure 7 is an enlarged sectional elevation on the line indicated by 7—7, Fig. 1.

There is provided a barrel 6 having one end closed by a cap 7. In this instance the cap 7 is connected with the barrel by a coupling 8, and a gasket 9 between the cap and said tubular portion prevents leakage when the barrel is immersed in water. In this particular instance the barrel 6 is made up of a number of tubular sections 10 which are connected to one another by couplings 11, there being gaskets 12 between the adjacent ends of the sections 10 to make the joints water-tight. The open end of the barrel 6 projects through a tubular sleeve 13 and a nut 14 and cap 15 screwed onto the barrel 6 at opposite ends of the sleeve 13 hold the barrel and sleeve assembled.

The sleeve 13 connects with a semi-spherical face 16 which movably fits in a semi-spherical socket 17, thus making a ball and socket form of universal joint. The socket 17 constitutes a base for movably supporting the barrel and the base may be secured by bolts 18 or other suitable fastening devices, to a supporting structure which is indicated at 19. This structure may be, for example, a vessel designed to be sustained in the air or water and the supporting structure 19, in this instance, is provided with an opening 20 through which the barrel 6 projects outboard.

The cap 15 is provided with a central spider 21. Bolted to the spider by a bolt 211 is a reel housing 22 in which feed and take-up reels 23, 24 for the film $a$ are positioned. The driving shaft of the take-up reel is indicated at 25 and is provided with a sheave 26 which is driven by an endless belt 27 that in turn is driven by a sheave 28 on a shaft 29. The shaft 29 is provided with a worm 30 driven by a wormwheel 31 mounted on the shaft 32 of an electric motor 33 that is secured to the cap 15 in any suitable manner opposite to the open end of the barrel.

The shaft 32 extends down into the barrel to near the lower end thereof and near said lower end is provided with a worm 34 in mesh with a wormwheel 35 which operates a film driving mechanism 36 of any suitable type. The mechanism 36 shown in the drawings is of a well known type of film driving mechanism and, accordingly, it is unnecessary to describe and illustrate it in detail. The shaft 32 is also provided with another worm 37 in mesh with a wormwheel 38 which is connected by a suitable driving gear, indicated in general at 39, to the usual rotary shutter 40. The shutter and its driving gear correspond to those employed with the type of film driving mechanism illustrated and, accordingly, they need not be described and illustrated in detail herein.

The film $a$ passes from the feed reel 23 and through an opening 231 in the cap 15 into the barrel 6 to the film driving mechanism 36, there being sprockets 41, 411 and tension rollers 42 at opposite ends of the film driving mechanism to maintain the film taut as it passes through said mechanism. The sprocket wheel 411 is mounted on a shaft 412 journaled in bearings 413 which are secured to a standard 414. The lower end of the standard 414 detachably engages a slot 415 in a bridge 416 at the lower end of the lowermost section 10 and the upper end of the standard 414 fits between lugs 417 on the inner face of the barrel 6.

The sprocket wheel 41 is mounted on a shaft 43 provided with a wormwheel 44 driven by a worm 45 on the motor shaft 32. The shaft 43 is journaled in bearings 431 secured to the standard 414. The film $a$ passes from the lower sprocket wheel 41 upwardly through the barrel and through an opening 232 in the cap 15 to the take-up reel 24. Thus, it will be readily understood, when the motor 33 is operated, the film is caused to move in the barrel and said film will be exposed in the manner well understood in this art at the portion registering with the camera aperture 46.

The aperture 46 is aligned with the lens barrel 47 and in front of the lens barrel is a window 60 in the barrel 10. The lens barrel 47 is movably mounted for the purpose of properly focusing the images upon the film and, in this instance, the barrel 47 is in telescopic relation with a tube 48, said barrel 47 sliding upon said tube. The sleeve 47 is provided with an ear 49 through which is threaded a screw 50 journaled in a bearing 51 on a bracket 52 that constitutes a portion of the frame 521 of the film driving mechanism. The screw 50 is provided with a miter gear 53 in mesh with a miter gear 54 on the shaft 55 that is journaled in bearings 56 on the frame 521. The shaft 55 extends upwardly in the barrel and through the cap 15, and is provided on its upper end with a finger 57 adapted to register with a distance scale 58 marked in a circle on the cap 15. The scale 58 indicates the proper setting for the finger 57 for adjustment of the lens barrel for different focal distances.

Extending lengthwise of the barrel 6 is a finder tube 59 which is provided, at its lower end at the side corresponding to the side of the barrel 6 having the window 60, with a lens 61. In the tube 59 opposite to the lens 61 is a mirror 62 set at an angle of 45° to the axis of the lens so as to reflect the image, projected on it by the lens 61, onto a ground glass 63 placed at the upper end of the tube 59. The tube 59 projects through the member 16 and the upper end of said tube is positioned alongside of the housing 22.

The member 16 is provided with handles 64 by which it may be turned, tilted to different angles, withdrawn from the socket 17 and replaced in said socket.

The camera described above operates as follows:

It may be assumed, for example, that the barrel 6 and tube 59 project through the bottom of a boat or other support into a body of water and that the scene to be photographed is within said body of water. The operator looks in the finder tube 59 and rotates the member 16 and also, if necessary, tilts the barrel so as to throw the image of the scene upon the ground glass 63. He turns the shaft 55 to register the finger 57 with the proper distance marking on the scale 58 for properly focusing the scene that is to be taken upon that portion of the film $a$ that is behind the aperture.

Electric current is then supplied to the motor 33 which then operates to actuate the film and make a succession of exposures on said film in the manner well understood in this art. While the film is being actuated, the barrel 6 may be turned about its axis or tilted to different angles so as to expose the film to other portions of the body of water in order that any action taking place within said body of water may be followed from one portion thereof to another.

It may be advisable to employ a shutter of the usual type, only the operating arm 65 of which can be seen in the drawings, and it is unnecessary to illustrate and describe such shutter in detail herein, since it is well understood in this art. It suffices to state in regard to the shutter that it is opened and closed by moving the arm 65 in opposite directions. To operate the arm 65 I connect therewith a rod 66 which extends through the cap 15 and pivotally connects at its upper end with an operating lever 67 fulcrumed at 68 on a bracket 69 that is mounted on the cap 15.

I claim:

1. A motion picture camera comprising a barrel having a window near one end, film exposure means in the barrel behind the window, film actuating means in the barrel adjacent to the film exposing means, a shaft extending longitudinally in the barrel operably connected with the film actuating means and with the film exposure means, and a motor mounted on the other end of the barrel and driving said shaft.

2. A motion picture camera comprising a barrel having a window near one end, film exposure means in the barrel behind the window including a slidably mounted lens barrel and a lens in said barrel, film actuating means in the barrel adjacent to the film exposure means, a motor mounted on the other end of the barrel, driving connections between the motor and the film actuating means and film exposure means, a shaft extending longitudinally in the first barrel, means operable by the shaft to slide the lens barrel in and out, and means operable by turning of the shaft to indicate the focusing position of the lens barrel.

3. A motion picture camera comprising a barrel having a window near one end, film exposure means in the barrel behind the window, film actuating means in the barrel adjacent to the film exposure means, a shaft extending longitudinally in the barrel operably connected with the film actuating means and with the film exposure means, and means to operate the shaft.

Signed at Los Angeles, this 28th day of November, 1925.

PAUL GUERIN.